United States Patent [19]

Rodgers

[11] 4,382,733
[45] May 10, 1983

[54] FREIGHT CRADLE WITH REPLACEABLE DEFORMABLE CUSHIONING INSERT

[76] Inventor: Kenneth G. Rodgers, 57, Aster Dr., Werrington, Peterborough, Cambridgeshire, England

[21] Appl. No.: 90,239

[22] Filed: Nov. 1, 1979

[30] Foreign Application Priority Data

Nov. 2, 1978 [GB] United Kingdom ............... 42920/78
Dec. 21, 1978 [GB] United Kingdom ............... 49711/78

[51] Int. Cl.$^3$ .......................... B60P 1/64; B60P 7/12; B61D 3/16; B61D 45/00
[52] U.S. Cl. .................................... 410/49; 108/55.3; 206/319; 248/346; 410/36; 410/52; 410/156
[58] Field of Search .................... 108/52.1, 55.1, 55.3; 206/523, 524, 591, 592, 319; 248/49, 105, 106, 346, 473; 410/38, 41, 46, 47, 48, 49, 32, 42, 52, 36, 156

[56] References Cited

U.S. PATENT DOCUMENTS

| | | | |
|---|---|---|---|
| 2,432,295 | 12/1947 | Donahue | 108/52.1 |
| 2,891,749 | 6/1959 | Heverly | 248/49 |
| 2,992,802 | 7/1961 | Spillios | 108/55.1 X |
| 3,292,778 | 12/1966 | Enderle | 206/523 |
| 3,307,691 | 3/1967 | Vallebona | 410/41 X |
| 3,452,958 | 7/1969 | Hambleton | 248/346 |
| 3,478,869 | 11/1969 | Walters | 206/524 X |
| 3,980,262 | 9/1976 | Lee | 248/49 X |
| 4,241,810 | 12/1980 | Neulon | 206/592 X |
| 4,305,508 | 12/1981 | Rodgers | 211/13 |

FOREIGN PATENT DOCUMENTS

| | | | |
|---|---|---|---|
| 1418284 | 10/1965 | France | 410/49 |
| 427212 | 4/1935 | United Kingdom | 410/42 |
| 492974 | 9/1938 | United Kingdom | 410/156 |
| 586905 | 4/1947 | United Kingdom | 410/156 |
| 847036 | 9/1960 | United Kingdom | 410/52 |
| 1159194 | 7/1969 | United Kingdom | 410/46 |
| 1268752 | 3/1972 | United Kingdom | 410/49 |
| 1287481 | 8/1972 | United Kingdom | 410/156 |
| 1360784 | 7/1974 | United Kingdom | 410/32 |
| 1409559 | 10/1975 | United Kingdom | 410/49 |
| 2024152 | 1/1980 | United Kingdom | 410/52 |

*Primary Examiner*—Robert B. Reeves
*Assistant Examiner*—Howard Beltran
*Attorney, Agent, or Firm*—Lawrence Rosen

[57] ABSTRACT

A disassembleable cradle for carrying internal combustion engines or the like is disclosed. The cradle includes two or more parallel bearers, each made, preferably of wood or plastics. Each bearer has two upright arms defining a U-shaped groove to receive a cushioning pad of a high-density material. The pad has a preferably U-shaped recess in its upper surface to receive an engine. The weight of the engine is borne edge-on by the pad, into which the engine settles somewhat, so that engines of different shapes can be accommodated. Longitudinal members are detachably received in lateral reesses in the bearers, which can be spaced therealong at any desired distance.

18 Claims, 8 Drawing Figures

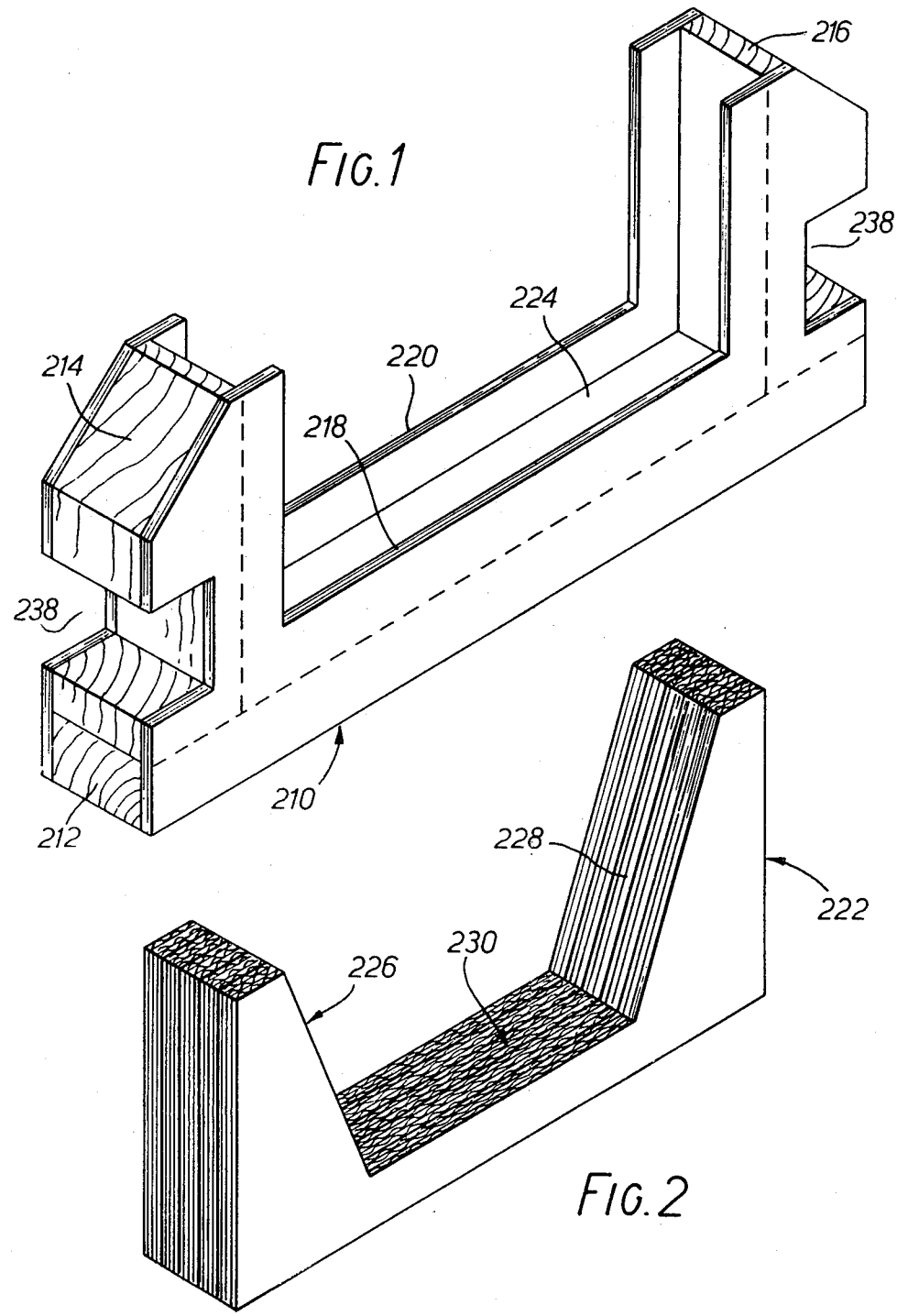

FREIGHT CRADLE WITH REPLACEABLE DEFORMABLE CUSHIONING INSERT

This invention relates to a cradle supporting an engine such as an internal combustion engine, or for supporting like equipment.

Engines are packaged for transport and export, and in the past it has been necessary to build a particular design of cradle for each size and type of engine. Such cradles were often of wood and sometimes of metal. The multiplicity of sizes and types of engines and like equipment made by manufacturers has given rise to the need for a large number of different designs and sizes of cradle. It has therefore been necessary for firms in the business of mechanical equipment and engine packaging to carry a large stock of each of a large number of types of cradle. This means that expensive storage space is taken up storing cradles and an undesirably large amount of capital is tied up in the cradles. It would meet a need in the industry if a multi-purpose cradle was available.

There have been various prior proposals relating to the construction of cradles. For example, there have been the proposals in British Pat. Nos. 847 036, 1 159 194, 1 268 752, 1 360 784 and 1 409 559. Pat. No. 847 036 shows a pallet of simple design which would be suitable for carrying flat objects but would not be satisfactory for carrying engineering parts of a complex shape, such as engines. In addition, it has no provision for cushioning the article being carried, and would not solve the problem to which the present invention addresses itself.

British Pat. Nos. 1 268 752 and 1 409 559 and French Pat. No. 1 418 284 show pallets for carrying articles such as barrels or kegs. The bearers have concave recesses therein but these would be quite unsuitable for supporting a variety of different-sized engineering parts, as different pallets would be required for different-sized barrels. Neither of these patents solves the problem faced by the present inventor.

British Pat. No. 1 360 784 discloses a simple pallet, reminiscent of Pat. No. 847 036 but especially designed for carrying corrugated sheets. It bears no real resemblance to the cradle which is the subject of this Specification and would not solve the problem to which the present invention is addressed.

British Pat. No. 427 212 shows a box or case specially constructed to carry electrical dynamos. Cross bearers in the box have truncated Vee-notches padded on each side with a rubber layer. While the rubber will deform to provide some cushioning effect, the box shown by this patent is not analagous to a cradle for engineering parts and a shippr would be obliged to stock many boxes of different sizes for different items such as different-sized vehicle engines. In addition the cushioning effect provided by the thin rubber strips in Pat. No. 427 212 is limited and contrasts with the substantial "settling movement" permitted to an engine carried in a cradle in accordance with this invention. The box shown in Pat. No. 427 212 does not represent a solution to the problem which is the concern of the present invention. British Pat. No. 586 905 shows a design of box but uses strawboard, etc, as padding in a flat configuration.

British Pat. No. 1 159 194 discloses a pallet for carrying tomatoes, and which may be made of polystyrene. Its design is such that it can be made in a single moulding operation and a plastics material is chosen so that the pallet is cheap enough to be disposable. A pallet of this kind offers no solution to the problem of the safe transport of heavy and valuable engineering items of different sizes.

U.S. Pat. No. 2,432,295 to Donahue shows a simple flat pallet in which edgewise use of corrugated cardboard is used to confer lightness on the construction. The Donahue patent does not teach towards making a single pallet capable of accommodating a large number of different items of equipment such as engines. U.S. Pat. No. 3,478,869 of Walters does recognise this problem, but requires a special form appropriate to each engine to appropriately shape a plastics foam support.

According to the present invention, there is provided a cradle including at least two generally parallel laterally-extending bearers and at least two longitudinally extending connection members, in which each of the bearers is constructed to define a pocket and the pocket is constructed for containing an approximately U-shaped pad of high density high strength cushioning material as herein defined.

Also according to the invention, we provide a bearer for use in constructing an article-carrying cradle, the bearer comprising a pair of spaced posts extending upwardly from a base member, the posts and the base member having contiguous recess which constitute a rectangular space for receiving a pad of high density high strength cushioning material.

Further according to the invention, we provide a cradle including at least two generally parallel laterally extending bearers and at least two longitudinally extending connection members, in which each of the bearers is constructed of synthetic plastics material to define a pocket and the pocket is constructed for containing an approximately U-shaped pad of high density high strength cushioning material as herein defined.

In this Specification, by high density high strength compressible cushioning material is meant a material such as multi-wall board (compressed normal to its edge) which compresses to a limited extent under an applied load, and the performance characteristic of compression versus applied load is substantially equivalent to that of multi-wall board compressed normal to its edge.

In this Specification the phrase multi-wall board is used to mean a laminate or corrugated paper and heavy paper or cardboard consisting of at least 3 layers of the latter sandwiching at least two layers of corrugated paper, the layers being secured together by adhesive. A laminate including 4 layers of heavy paper or cardboard and 3 layers of corrugated paper would be equally suitable. One example of a suitable multi-wall board is that known as TRI-WALL MARKETED BY TRI-Wall Containers Limited of London, W1Y 5AA. Another example of multi-wall board is shown in British Pat. No. 492 974 wherein strips of such material are used as buffer strips in the packing of radios, etc., in cardboard or like boxes. It is noted that the loading bearing surface is the face rather than the edge of the multi-wall board in this patent. A similar comment applies to the cellular packaging structure shown in British Pat. No. 1 287 481.

A preferred range of angles for the edges to make with the horizontal is the range 100 to 120 degrees.

Each cushioning pad may be made of at least four multi-wall boards adhesively laminated together. Each bearer may be reinforced by one or more additional multi-wall boards laminated to either or both faces thereof.

The connection members may also be made of laminated multi-wall board.

The bearers may be generally rectangular in shape modified in that each has a cut-out to receive a connection member on each side. An outer edge of one of the posts is preferably inclined to the vertical in the normal position of the cradle.

The invention also provides cradles constructed according to the foregoing principles and capable of receiving and carrying two, or three, or board, and by the location of edges thereof at a specified range of angles to the horizontal, it is possible to accommodate a wide variety of engine sizes and types in a single cradle. The parts of the inclined edges upon which the engine bearers are compressed in use by the weight of the engine which consequently sinks into a relatively secure and stable position on the cradle. It may be secured thereto by strapping or by shrink-wrapping or in any other convenient way. By the use of Multi-wall board, the likelihood of damage to the engine is reduced.

Each cushioning pad is constructed so that it defines a recess for receiving an engine or other article of equipment; the recess is preferably bounded by two inclined surfaces and a flat bottom wall. Each of the inclined walls may be inclined at an angle in the range 95 to 125 degrees.

The bearers may be constructed of wood or plastics material and may have recesses cut into their outer lateral walls; these recesses are of such a size and shape to receive the longitudinal connection members as a snug push fit therein. This manner of construction is particularly advantageous in a case where the connection members are also made of multi-wall boards laminated together and having the planes of lamination vertical. They are then retained securely in the recesses by the frictional force between the edges of the multi-wall boards and the upper and lower walls of the recesses.

In this Specification, while reference is frequently made to an engine being carried by the cradle, it will be understood that the cradles according to the invention could equally well be useful in carrying other equipment.

The invention will be better understood from the following particular description given with reference to the accompanying drawings in which:

FIG. 1 is a perspective view of an example of a bearer according to an advantageous embodiment of the invention;

FIG. 2 is a perspective view of a pad made from multi-wall board, and intended for insertion in the pocket of the bearer of FIG. 1;

In this Specification, reference is made to multi-wall board. Each multi-wall board can be a double-wall board or a triple-wall board or a quadruple-wall board, or other type of board as desired. However, in laminating a cushioning pad for use in the present invention it will usually be preferably to use say 4 to 5 triple-wall boards, or 6 to 8 double-wall boards, or an equivalent number of other types of multi-wall board laminated together. For avoidance of doubt, it should be explained that a double-wall board is a board having three substantially flat layers of heavy paper or thin cardboard between the first and second of which, and between the second and third of which is sandwiched a layer of corrugated paper, the assembly being adhesively secured together. Likewise a triple-wall board has 4 flat layers interleaved with 3 corrugated layers.

The invention as specifically described and illustrated hereinafter is believed to be a new and useful design of cradle which is widely applicable and allows the user to dispense with large stocks of different conventional cradles. The carrying length can be adjusted easily and engines of different base width form their own stable nesting position. The cradle can be easily made from relatively inexpensive material without the need for highly skilled craftsmen. The cut-out for the engine or other equipment being carried can be off-set from centre is required. The adjustable cradle is a cushion pack in its own right and is designed to be used preferably in conjunction with polyethylene shrink wrap cover, requiring no other type of fixing. The cradle has a weight advantage over (i.e. is lighter than) metal or timber equivalents for loads of corresponding size. Cradles for more than one engine can readily be made. Safety of the product in transit is enhanced by the use of this cradle, all parts of which may have a cushioning action. By the use of the present cradle, a lower centre of gravity may be obtained in the resulting package, with consequential improved stability.

Figure 7:
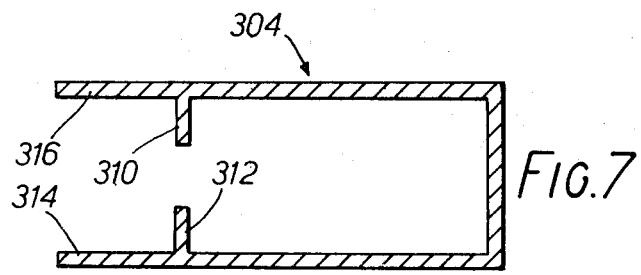
FIG. 7 is a section on line B—B of FIG. 4 on a somewhat enlarged scale, and showing a slightly modified construction.

Referring now to FIGS. 1 and 2, the illustrated bearer 210 may be made of any suitable material such as wood or a synthetic plastics material. It includes a laterally extending base member 212 and two posts 214, 216 upstanding therefrom. The posts may be integral with or rigidly fixed to the base member 212. The base member 212 is connected to the posts 214, 216 by front and rear sheets 218, 220 of suitable material. For example the sheets 218, 220 may be of plywood or may be relatively rigid sheets of plastic material bonded by adhesive or otherwise secured to the parts 212, 214, 216. In combination with the posts 214, 216 and the base member 212 the sheets 218, 220 define a pocket. In the illustrated example the pocket is generally rectangular in shape and receives a pad 222. A pad 222 is formed by 5 layers of multi-wall board laminated together, and when received in the pocket the bottom face of the pad rests on the upper surface 224 of the base member 212. The pad of course could be made of a different number of layers. The thickness of the pad 222 is such that it fits between the sheets 218, 220. The pad has inclined surfaces 226, 228 and an upwardly-facing base surface 230. The surfaces 226, 228 are inclined at an angle to the vertical and in use serve to support an engine or like item of equipment in the manner illustrated in FIGS. 7, 8 and 8A and described in the associated description in the present applicant's U.S. patent application Ser. No. 933696, now U.S. Pat. No. 4,305,508, the disclosure of which is incorporated herein by reference. The surfaces 226 and 228 may be at from 95 to 125 degrees fo the horizontal and preferably 110 to 115 degrees.

The pad 222 may be readily lifted out of the recess after use, and replaced by a new pad. This has the advantage that the structural members 212, 214 and 216 are not damaged or worn due to rubbing by the engine whilst in transit, and the replaceable pads are inexpensive and easily inserted and removed when they have served their purpose.

The bearer has a recess of 238 in each its outer sides. These recesses are provided to receive longitudinal connection members or stringers so that a cradle may readily be assembled in the manner disclosed in FIG. 8 hereof.

The bearer 210 may be moulded as an integral unit from synthetic plastics material.

It will be appreciated that modifications can be made without departing from the invention. For example, in order to save material when moulding plastics, the parts of the sheets 218, 220 which bound the rectangular recess occupied by the pad 222 may be of castellated shape. Alternatively, or in addition the posts 214, 216 may be partly hollow also to save material. The base member 212 and posts 214, 216 could be of wood and the sheets 218, 220 of plastics.

Another advantageous alternative embodiment of the invention will now be described with reference to FIGS. 3 to 7 of the drawings.

Figure 8:
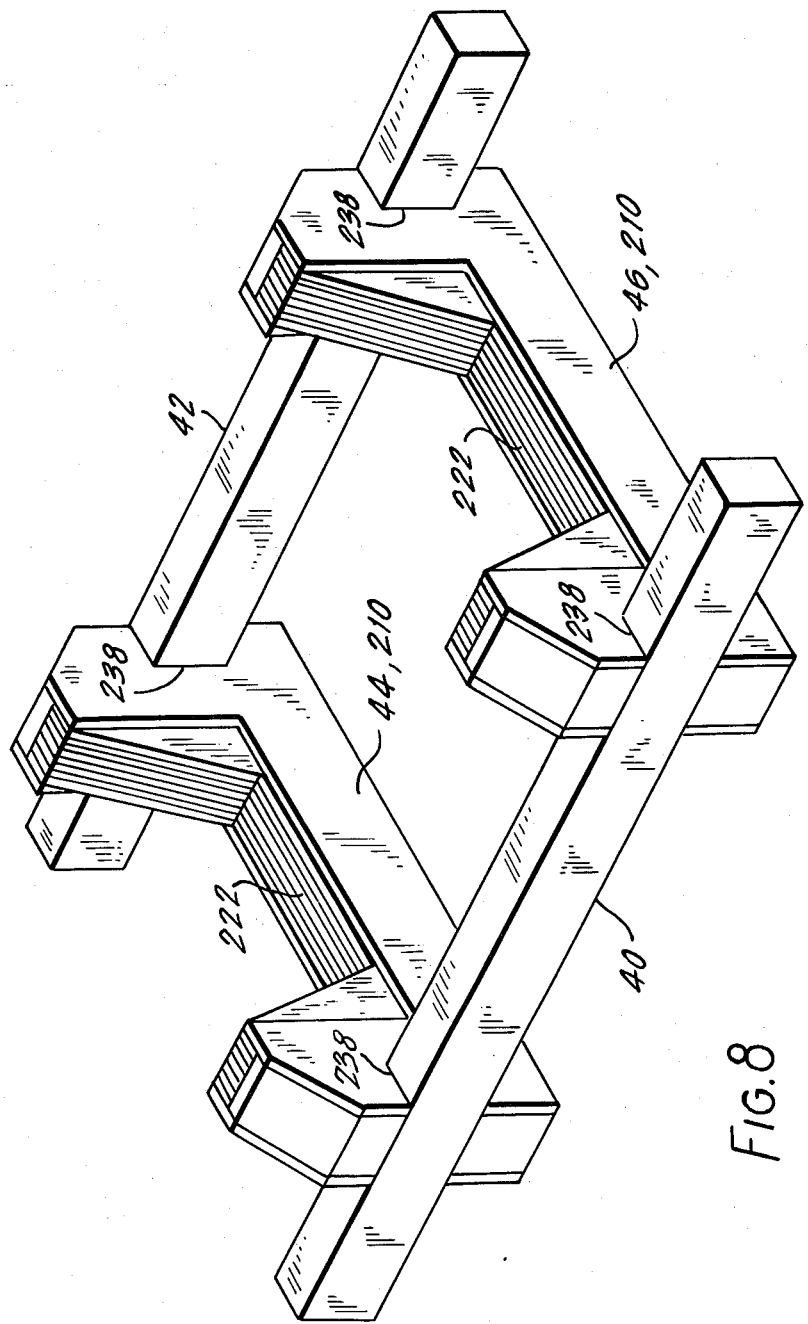
FIG. 8 is a view of another cradle, showing the use of stringers.

The illustrated bearer 300 is intended for use in a cradle of the general design shown in FIG. 8 hereof. It is preferably injection moulded from any suitable injection-mouldable synthetic plastics material. For example, one may utilise polystyrene or polyurethane resins.

The illustrated bearer includes a transverse member 301 joining two upstanding posts 302, 304 and made of a hollow box-section construction with cross-stiffeners 306 (FIG. 6) to give strength. Each post is also of hollow box-section with cross-stiffeners 308. Each post has inwardly-extending flanges (seen at 310, 312 in FIG. 7) to define the lateral limits of a pad-receiving recess, the fore-and-aft limits of said recess are defined by walls 314, 316 of the posts and walls 315, 317 of the cross member 301. The base of said pad recess is formed by the wall 318 (FIG. 6) of the transverse member 300. It will be appreciated that other specific constructions can be adopted to define a recess for receiving a pad such as the pad 220 seen in FIG. 3.

The illustrated bearer has a pair of recesses 322 for receiving a longitudinal connection member, shown in FIG. 8, also called a stringer. It is an advantageous feature of the present invention that the top and bottom edges of these recesses each have deformable plastics retaining tabs 324 which serve to retain respective stringers in the recess when the cradle is assembled.

The use of stringers is shown in FIG. 8, in which stringers 40, 42 are received in recesses made for that purpose in the side edges of bearers 44, 46. The engagement of the stringers 40, 42 with the bearers 44, 46 in the manner shown, wherein the stringers 40, 42 and the bearers 44, 46 each define one side of a rectangle, forms a cradle suitable for receiving a heavy object. It is contemplated to use stringers in the same manner in engagement with recesses 238 of bearers 210 or recesses 322 of bearers 300 to form a cradle according to the present invention.

Figure 3:
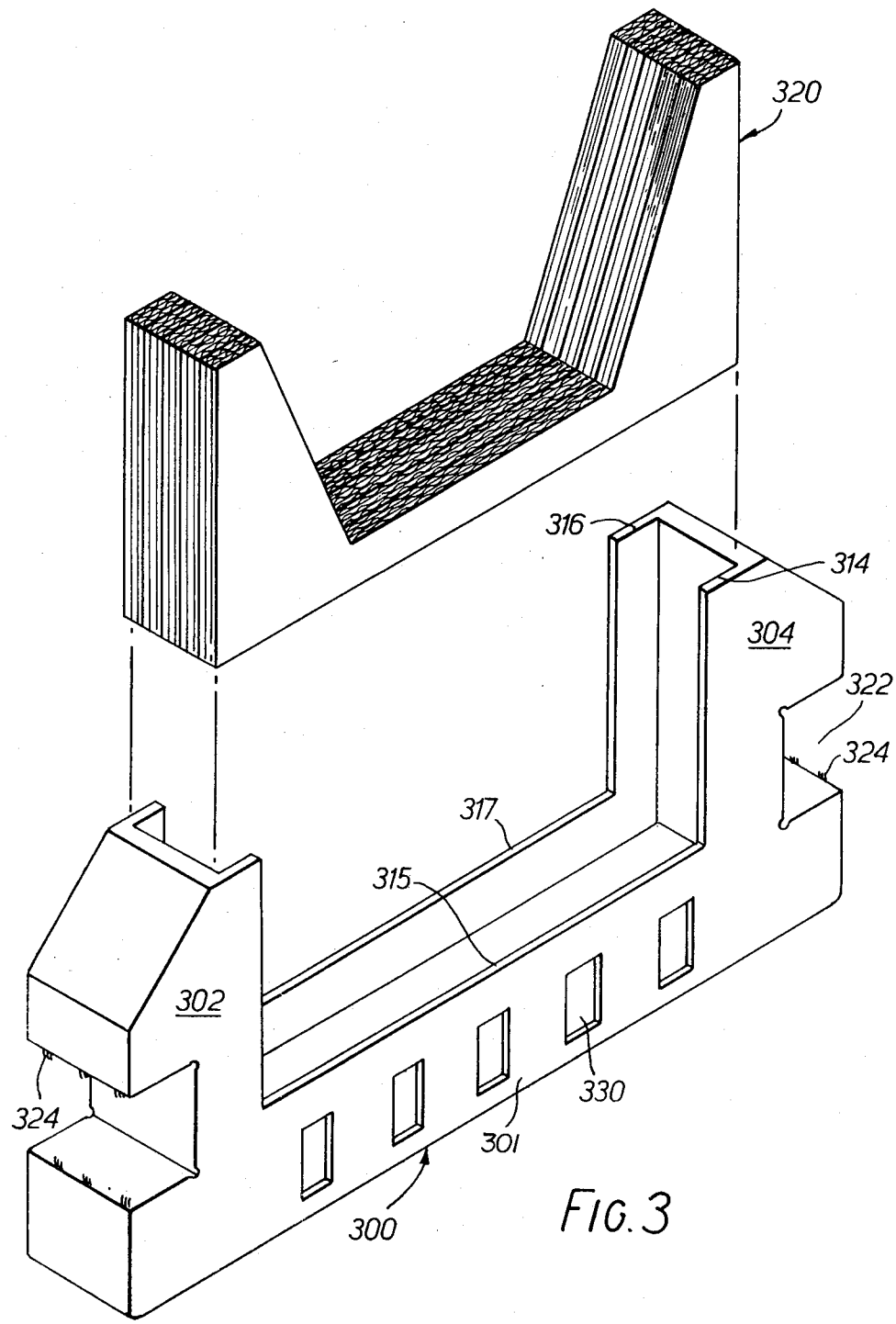
FIG. 3 is a perspective view of one exmaple of bearer according to the invention, showing a pad about to be inserted therein.
Figure 4:
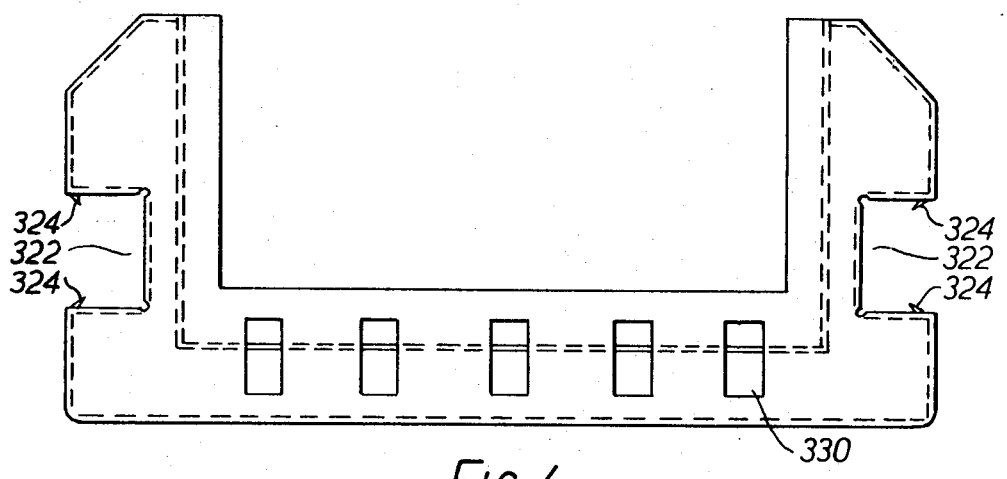
FIG. 4 is a front view of the bearer of FIG. 3.
Figure 5:
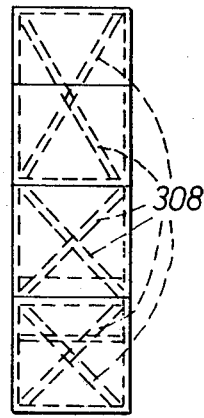
FIG. 5 is an end view of the bearer shown in FIG. 4.
Figure 6:
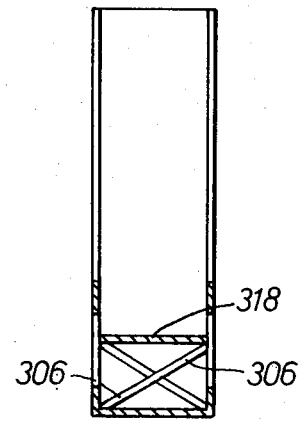
FIG. 6 is a cross-section on the line A—A in FIG. 4.

As seen in FIGS. 3 and 4, the front and rear walls of the member 301 have apertures or windows 330 therein in order to save material and reduce weight of the bearer.

An advantage of a bearer of this design is that the pad can be readily replaced for each journey of the cradle and the overall assembley is light and durable, largely weatherproof, and inexpensive to manufacture.

In an alternative construction the walls 310 and 312 (FIG. 7) can be replaced by one continuous wall. The posts then have the appearance of those seen in FIG. 3.

What is claimed is:

1. A cradle including at least two generally parallel laterally-extending bearers made of a first material, and at least two longitudinally extending connection members, each of the connection members being releasably attached to the bearers in such a manner that the bearers can be spaced apart any desired distance along the length of the connection members; and each of the bearers being constructed to define a pocket; and an approximately U-shaped cushioning pad removably received in the pocket, the pad being comprised of a plurality of multi-wall boards laminated together, the pad being adapted to be received in the pocket with such an orientation as to receive on the edges of the multi-wall boards the weight of any object placed in the recess, the pad being constructed to define a recess for receiving an article to be carried; and the recess in the pad further being so shaped that the pad will be slightly permanently deformed when an article to be carried is inserted therein.

2. A combination according to claim 1 in which the pad is made of a plurality of at least four of the multi-wall boards laminated together.

3. A cradle according to claim 1 in which the connection members are made of multi-wall board.

4. A cradle according to claim 1, in which each pad is received in the pocket of the corresponding bearer by a push-fit.

5. A cradle according to claim 1 in which each bearer has a cut-out shaped and dimensioned to receive as a push fit a connection member on each side.

6. A cradle according to claim 5 in which each of the connection members is a tight push-fit in a corresponding pair of recesses, one in each bearer, and said fit constitutes the sole means of securing the members to the bearers.

7. A cradle according to claim 1 in which each edge makes obtuse angle with the horizontal in the normal horizontal orientation of the cradle.

8. A cradle according to claim 7 in which an outer edge of one of the posts is inclined to the vertical in the normal position of the cradle.

9. In combination, a bearer for use in constructing an article-carrying cradle, the bearer being made of a first material, the bearer comprising a pair of spaced posts extending upwardly from a base member, the posts and the base member having contiguous recesses which constitute a rectangular space for receiving a pad of high density high strength cushioning material; and a cushioning pad removably received in the rectangular space defined by the contiguous recesses of the bearer, the pad being comprised of a plurality of multi-wall boards laminated together, the pad being adapted to be received in the pocket with such an orientation as to receive on the edges of the multi-wall boards the weight of any object placed in the recess, the pad being constructed to define a recess for receiving the article to be carried, the recess in the pad being partly bounded by two inclined surfaces each of which makes an obtuse angle with the horizontal; and the recess in the pad further being so shaped that the pad will be slightly permanently deformed when an article to be carried is inserted therein.

10. A bearer according to claim 9 in which the bearer is of synthetic plastics material.

11. A combination according to claim 9 in which the pad is made of a plurality of at least four of the multi-wall boards laminated together.

12. A cradle including at least two generally parallel laterally-extending bearers, and at least two longitudinally extending connection members, each of the connection members being releasably attached to the bearers, in such a manner that the bearers can be spaced apart any desired distance along the length of the connection members; and each of the bearers being constructed of synthetic plastics material and being constructed to define a pocket; and an approximately U-shaped cushioning pad adapted to be recieved in the pocket, the pad being comprised of a plurality of multi-wall boards laminated together, the pad being adapted to be received in the pocket with such an orientation as to receive on the edges of the multi-wall boards the weight of any object placed in the recess, the pad being constructed to define a recess for receiving an article to be carried; and the recess in the pad further being so shaped that the pad will be slightly permanently deformed when an article to be carried is inserted therein.

13. A cradle according to claim 12 in which the connection members are made of a multi-wall board.

14. A cradle according to claim 12, in which each pad is received in the pocket of the corresponding bearer by a push-fit.

15. A cradle according to claim 12 in which each bearer has a cut-out shaped and dimensioned to receive as a push fit a connection member on each side.

16. A cradle according to claim 15 in which each of the connection members is a tight push-fit in a corresponding pair of recesses, one in each bearer, and said fit constitutes the sole means of securing the members to the bearers.

17. A cradle according to claim 12 in which each edge makes an obtuse angle with the horizontal in the normal horizontal orientation of the cradle.

18. A cradle according to claim 17 in which an outer edge of one of the posts is inclined to the vertical in the normal position of the cradle.

* * * * *